May 31, 1927.

N. B. PARRISH

EGG CONTAINER

Filed July 9, 1926

INVENTOR
NELSON B. PARRISH.
BY
Oscar T. DeWitt
ATTORNEY

Patented May 31, 1927.

1,631,055

UNITED STATES PATENT OFFICE.

NELSON B. PARRISH, OF GREAT BARRINGTON, MASSACHUSETTS.

EGG CONTAINER.

Application filed July 9, 1926. Serial No. 121,482

The invention relates to an egg container to provide means to ship eggs long distances and to provide against breakage of the said eggs.

Another object of the invention is to provide an egg container that is so constructed and designed that the eggs within the container are firmly held in position, therefore eliminating any shifting about of the eggs within the container.

A further object of the egg container is to provide means whereby the eggs are firmly held on end in a vertical position, and each layer of eggs separated from one another, and each layer of eggs consisting of a separate unit, and held in position independent of the succeeding layer.

It has been found from actual experience that my egg container may be dropped, from ordinary heights incidental to shipping, or may be rolled and thrown about, and from such usage given to my egg container the eggs within the egg container will not be displaced or injured, as the peculiar interior construction of my egg container will firmly hold the eggs in position.

With these and other objects in view, the invention consists in certain features of construction and combination of parts as hereinafter set forth and pointed out in the claims.

In the drawings accompanying and forming a part of this specification:

Figure 1:
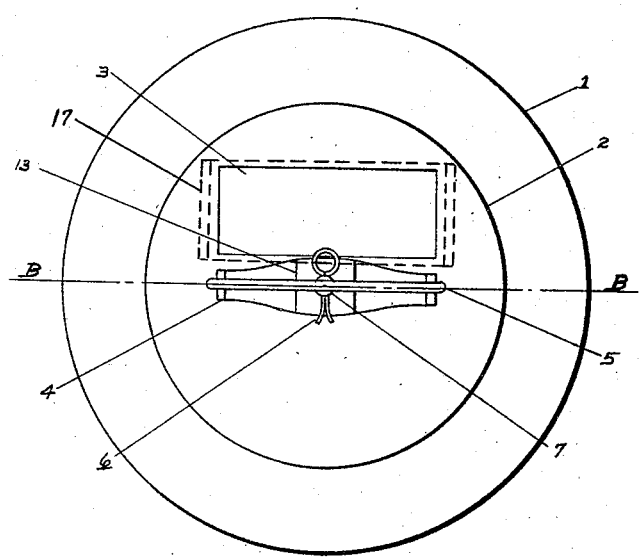
Figure 1 is a plan view.
Figure 3:
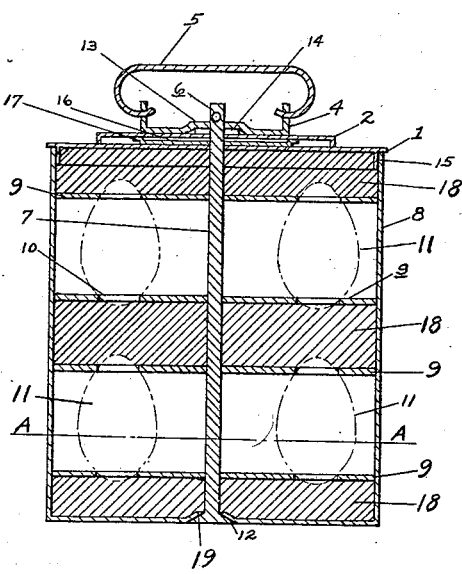
Figure 3 is a vertical sectional view on the line 3—3 of Fig. 1.
Figure 2:
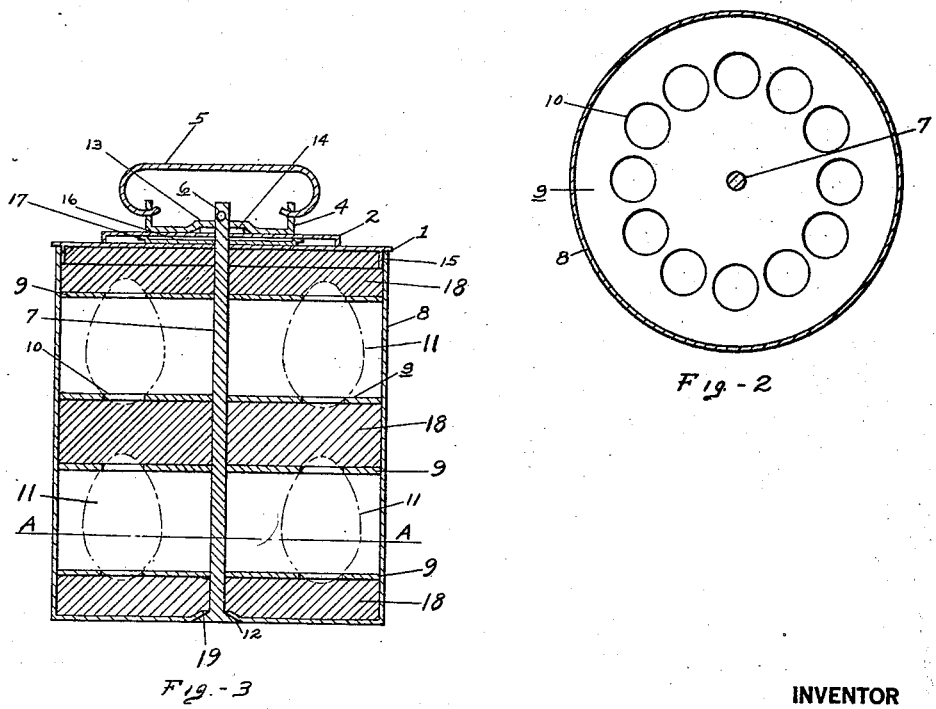
Figure 2 is a sectional view on the line 2—2 of Fig. 3.

In the drawings, 8 represents a casing, preferably of circular design, and the said casing is provided at the bottom with a countersunk recess 12 to provide means to cause the head of the tie rod 7 to set flush with the bottom of the casing. The casing is further provided with a cover 1, which cover has a shoulder 15 extending around the entire perimeter, and when the cover is placed on the casing the shoulder 15 seats within the casing thereby strengthening and protecting the top of the casing.

A plurality of disks 9 are placed within the casing 8, and the said disks are provided with a plurality of holes 10. It will be seen by referring to the drawing, that the ends of the eggs 11, which eggs are shown by the dotted lines, are placed in the holes of the disks and firmly held in a vertical position, a position in which the eggs can withstand the greatest pressure without injury. The distance between the layers of eggs in the egg container can be regulated by means of ground cork 18 or other similar substance, which ground cork also provides a means for protection of the successive layers of eggs. The disks 9 aside from holding the eggs in position, also act as a means for protecting the casing from injury or indentation.

A clamping cover 2 is placed on top of the cover 1. The said clamping cover is provided with an opening 3 for the purpose of inserting a card with shipping directions. A card receptacle 17 is secured to the under side of the clamping cover 2 by means of sweating or otherwise, and the said card receptacle is brought flush with the under side of the clamping cover. The card may be held in position by having the tie rod 7 pass thru the inner side of the said card after being inserted in the slot 16.

A clamp 4, which clamp is provided with a projection 13 in the center for the insertion of the gasket 14, is placed over the clamping cover 1. A handle 5 which is secured to the clamp 4, provides the means for carrying the egg container.

The tie rod 7 passes thru the center of the disks 9 and holds them in position, and the said tie rod also passes thru the center of the clamping cover 1 and the clamp 4. The tie rod acts as the means to hold the cover 1, the clamping cover 2 and the clamp 4 in position. This is accomplished by making the hole in the tie rod for the insertion of the cotter pin 6 slightly less than the over all height of the egg container to the top of the projection 13 on the clamp 4. A pressure exerted on the center of the clamp 4 will cause the cover 1 to become slightly concave, and the cotter pin 6 can be inserted in the tie rod 7, and the resiliency of the cover 1 will hold the cotter pin in the tie rod.

The egg container is made water tight by inserting a gasket 14 under the clamp 4 and over the tie rod at the top, and also a gasket 19 under the head of the tie rod.

What I claim is:

1. In a device of the class described comprising a casing, a cover for the said casing, said cover provided with a shoulder extending around the entire perimeter and said shoulder designed to seat within the casing, a clamping cover superimposed on the said cover, said clamping cover provided with an opening on the top and a card receptacle attached on the inner side of said clamping cover, said clamping cover and card receptacle cooperating to hold a shipping card, said card receptacle in alignment with the bottom of the said clamping cover, a clamp for said clamping cover, said clamp provided with a projection in the center to provide means for the insertion of a gasket, a handle attached to said clamp, a plurality of disks within the casing, said disks provided with a plurality of holes, a tie rod passing thru the casing, the disks, the clamping cover and the clamp, means to secure the tie rod in position and seal the casing water tight.

2. In a device of the class described comprising a casing provided with a countersunk hole in the bottom, a cover for said casing, a clamping cover superimposed on the said cover, said clamping cover provided with an opening on the top and a card receptacle attached on the inner side of said clamping cover, said clamping cover and card receptacle cooperating to hold a shipping card, a clamp superimposed on said clamping cover, a handle for said clamp, a plurality of disks within the casing, said disks provided with a plurality of holes, said holes in the disks in alignment in a vertical position, a tie rod provided with gaskets, the head of the said tie rod setting in the countersunk in the bottom of the casing, and the said tie rod passing thru the center of the casing, the disks, the clamping cover and the clamp, means to secure the tie rod in position and seal the casing water tight.

In testimony whereof I affix my signature.

NELSON B. PARRISH.